(12) United States Patent
Suzuki et al.

(10) Patent No.: US 8,900,759 B2
(45) Date of Patent: Dec. 2, 2014

(54) ELECTROCHEMICAL REACTOR BUNDLES, STACKS, AND ELECTROCHEMICAL REACTOR SYSTEMS CONSISTING OF THESE COMPONENTS

(75) Inventors: Toshio Suzuki, Aichi (JP); Toshiaki Yamaguchi, Aichi (JP); Yoshinobu Fujishiro, Aichi (JP); Masanobu Awano, Aichi (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 1216 days.

(21) Appl. No.: 12/394,710

(22) Filed: Feb. 27, 2009

(65) Prior Publication Data
US 2009/0214919 A1 Aug. 27, 2009

(30) Foreign Application Priority Data
Feb. 27, 2008 (JP) ................... 2008-046914

(51) Int. Cl.
| H01M 8/00 | (2006.01) |
| H01M 2/38 | (2006.01) |
| H01M 2/40 | (2006.01) |
| H01M 8/24 | (2006.01) |
| H01M 8/12 | (2006.01) |

(52) U.S. Cl.
CPC .............. *H01M 8/243* (2013.01); *H01M 8/004* (2013.01); *H04M 8/1246* (2013.01); *H01M 8/1213* (2013.01); *Y02E 60/50* (2013.01)
USPC .......................................... 429/400; 429/456

(58) Field of Classification Search
USPC .................................................. 429/31, 456
See application file for complete search history.

(56) References Cited

U.S. PATENT DOCUMENTS

| 5,827,620 | A | * | 10/1998 | Kendall | ................. 429/441 |
| 2004/0005498 | A1 | * | 1/2004 | Eshraghi | ................. 429/140 |
| 2005/0037252 | A1 | * | 2/2005 | Pham | ................. 429/31 |
| 2007/0224481 | A1 | | 9/2007 | Suzuki et al. | |

FOREIGN PATENT DOCUMENTS

| JP | 2004-335277 | * 11/2004 | .............. H01M 8/02 |
| WO | WO03100881 | * 12/2003 | |

OTHER PUBLICATIONS

Webster's Ninth Collegiate Dictionary (Sheet Websters Ninth Collegiate Dictionary 1985 p. 1084).*
Jonghe (Composite Architectures for Sub-600 Degree Celsius Fuel Cells; Feasibility Analysis and Final EISG Report, May 2005; California Energy Commission CEC-500-2005-080 Grant # 99-35 Term Aug. 2000-Dec. 2001; University of California, Berkeley, Berkeley CA.*
Carrette et al Fuel Cells 2001 vol. 1 No. 1 pp. 5-39.*
van der Laag et al Journal of the American Ceramic Socieity vol. 88 No. 3 pp. 660-665 2005.*
Zongping Shao, et al., "A high-performance cathode for the next generation of solid-oxide fuel cells", Nature , vol. 431, Sep. 9, 2004, pp. 170-173.
Takashi Hibino, et al., "An Intermediate-Temperature Solid Oxide Fuel Cell Providing Higher Performance with Hydrocarbons than with Hydrogen", Electrochemical and Solid-State Letters, 5 (11) pp. A242-A244, 2002.

* cited by examiner

*Primary Examiner* — Patrick Ryan
*Assistant Examiner* — Aaron Greso
(74) *Attorney, Agent, or Firm* — Oblon, Spivak, McClelland, Maier & Neustadt, L.L.P.

(57) ABSTRACT

Tube electrochemical reactor bundle or stack, having a structure, in which a plurality of tube fuel cells, formed of a dense ion conductor (electrolyte) and cathode (air electrode) laminated to an anode (fuel electrode) material having a tube structure, are electrically connected by a thin metallic wire, and an electrochemical reactor system using them are provided.

8 Claims, 12 Drawing Sheets

Prior Art

TUBE END SECURED BY COLLECTOR PART

CUBE STACK 12

$1 \times 1 \times 0.8$ cm
20 TUBE CELLS

ELECTROCHEMICAL REACTOR BUNDLES, STACKS, AND ELECTROCHEMICAL REACTOR SYSTEMS CONSISTING OF THESE COMPONENTS

BACKGROUND OF THE INVENTION

1. Field of the Invention

The present invention relates to an electrochemical reactor cell stack and to an electrochemical reactor system such as a solid oxide fuel cell formed of such a reactor cell stack, and more specifically relates to an electrochemical reactor system employing tube electrochemical reactor cells which are capable of dramatically increasing the output per unit volume through the use of specific electrochemical reactor bundles and stacks. The present invention provides novel techniques and novel products related to electrochemical reactor cell bundles and stacks as well as electrochemical reactor systems employing such reactor cell stacks, which are suitable for use as clean energy sources and environmental purification devices.

2. Description of the Related Art

Solid oxide fuel cells (SOFC) are known as typical electrochemical reactors. An SOFC is a fuel cell in which an ion-conductive solid oxide electrolyte is used as the electrolyte. The basic structure of the SOFC is usually composed of three layers including a cathode (air electrode), solid acid electrolyte, and anode (fuel electrode), and is normally used at an operating temperature range of 800 to 1000° C.

When a fuel gas (such as hydrogen, carbon monoxide, or a hydrocarbon) is supplied to the anode of the SOFC and air, oxygen or the like is supplied to the cathode, a difference occurs between the oxygen partial pressure of the cathode and the oxygen partial pressure of the anode, and voltage is thereby produced across the electrodes according to the Nernst equation. The oxygen is converted to ions at the cathode, which travel through the interior of the dense electrolyte to the anode, and the oxygen ions which reach the anode react with the fuel gas, releasing electrons. As a result, a load is applied to the anode and cathode, allowing electricity to be directly extracted.

To make a more practical SOFC, the SOFC operating temperature will have to be lowered, and to achieve that, it may be effective to form the electrolyte into a thin film and use an electrolyte material with high ion conductivity. Anode support-type cells have been widely researched because the use of a support made with an electrode material allows electrolytes to be formed into thin film. Lowering the operating temperature to between 500 and 600° C. is expected to allow less expensive materials to be used and operating costs to be reduced, thereby expanding SOFC applications.

Flat types of SOFCs with a high power output of 0.8 to 1 $W/cm^2$ at a low temperature (600° C.) have thus far been reported with the proposal of new anode and cathode materials (Z. Shao and S. M. Haile, Nature 431, 170-173 (2004); T. Hibino, A. Hashimoto, K. Asano, M. Yano, M. Suzuki and M. Sano, Eletrochem. Solid-State Lett., 5(11), A242-A244 (2002)).

However, the anode support-type SOFCs with high power output that have been reported thus far are the flat type, which are susceptible to cell failure under extreme operating cycle conditions. That is because the cells become deformed and fail as a result of the considerable change in volume in commonly used nickel cermet anode due to temperature changes and cycling in oxygen-reducing atmospheres.

An extremely important technical issue is therefore to find a way of enlarging and stacking flat SOFCs while preserving flat cell performance. Controlling the electrode structure of the anode support substrate and making it thinner are important in terms of improving performance, but it has been difficult to further reduce the thickness and increase the porosity of flat types. SOFC structures consisting of tubular cells have been researched as alternatives to flat cells (JP 2004-335277 A).

The tube cell bundles and stacks that have been proposed thus far have a structure in which the tube cells are stabilized and held by stacking structures composed of a cathode material, and are the kind in which current is collected from the anode and cathode using electrode-collector sheets and the like.

Figure 1:
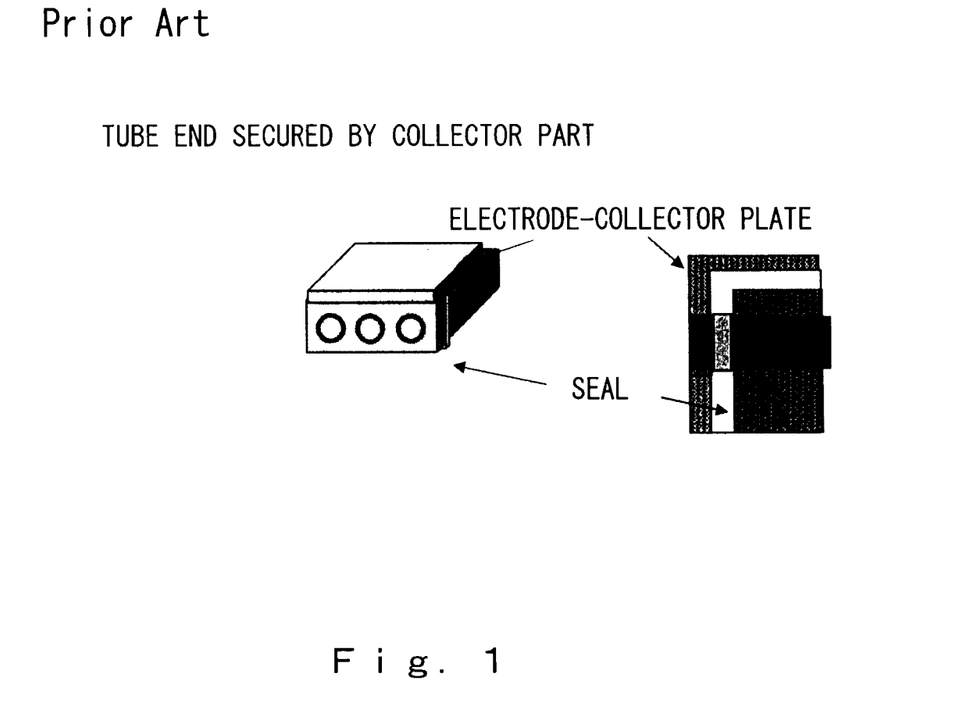
FIG. 1 is a schematic diagram of a conventional tube electrochemical reactor cell bundle.

However, in conventional tubular cell bundles and stacks, the ends of the tubes are secured by collector parts (see FIG. 1), and the current design makes it difficult to join the tube ends with the collector parts, resulting in problems such as greater contact resistance, and less thermal shock resistance because the tubes are secured by collector parts. In addition, ever smaller tube diameters have led to demand for higher tube positional precision. This has led to greater difficult in controlling the position when electrode-collector plates are attached, and so far no new techniques allowing such problems to be overcome have yet been proposed in this technical field.

Under these circumstances, the inventors undertook extensive research in view of the prior art noted above to develop a novel type of SOFC and novel uses capable of definitively solving the problems of conventional parts involved in securing the above tube tips with collector parts. As a result, the inventors developed a novel collector method for bundle structures comprising the arrangement of micro-diameter tube cells as well as a stacking method using them, and perfected the present invention through further research upon finding that these stacks can be used to construct a novel electrochemical reactor system allowing the operating temperature to be lowered, etc.

SUMMARY OF THE INVENTION

That is, an object of the present invention is to provide a novel collector method for bundle structures comprising the arrangement of micro-diameter tube cells as well as a stacking method using them. Another object of the present invention is to provide bundles which can be easily stacked and which allow current to be efficiently collected from tube electrochemical reactor cells having a cell structure capable of operating at a lower temperature, as well as the stacks composed thereof. Yet another object of the invention is to provide an electrochemical reactor system such as a solid oxide fuel cell utilizing the above tube electrochemical reactor cell stack.

To address these objects, the present invention comprises the following technical means.

(1) An electrochemical reactor bundle or stack having an electrochemical reactor bundle or stack structure, comprising a plurality of tube fuel cells, in which each cell is formed of a dense ion conductor (electrolyte) and cathode (air electrode) which are laminated to an anode (fuel electrode) material having a tube structure, the plurality of tube fuel cells are electrically connected in parallel or in series by collector wiring.

(2) The electrochemical reactor bundle according to (1) above, wherein the plurality of tube fuel cells are electrically connected in parallel by collector wiring.

(3) The electrochemical reactor stack according to (1) above, wherein the plurality of tube fuel cells are electrically connected in series by collector wiring.

(4) The electrochemical reactor bundle or stack according to any one of (1) through (3) above, wherein the collector wiring is formed of thin metallic wire.

(5) The electrochemical reactor bundle or stack according to (1) above, wherein the tube structure comprises a submillimeter diameter tubes having a tube diameter not greater than 2 mm and a tube thickness not greater than 0.5 mm.

(6) An electrochemical reactor bundle, comprising a structure of a plurality of tube fuel cells, in which each cell is formed of a dense ion conductor (electrolyte) and cathode (air electrode) which are laminated to a tube structure made of an anode (fuel cell) material, the plurality of tube fuel cells are integrated in parallel, an exposed tube tip of the anode is connected in parallel by collector wiring and is connected to a collector sheet via a seal layer.

(7) The electrochemical reactor stack, comprising longitudinally stacked electrochemical reactor bundles defined in (6) above.

(8) The electrochemical reactor system, comprising electrochemical reactor cell stacks defined in (7) above, wherein an operating temperature thereof is a lowered temperature of, at most, 650° C.

(9) The electrochemical reactor system according to (8) above, wherein the electrochemical reactor system is an electrochemical reactor system for a solid oxide fuel cell, waste gas purification, hydrogen production, or synthetic gas production.

The present invention is illustrated in further detail below.

The present invention is an electrochemical reactor bundle or stack structure, which is characterized by comprising a structure in which a plurality of tube fuel cells composed of a dense ion conductor (electrolyte) and cathode (air electrode) laminated to an anode having a tube structure (fuel electrode) are electrically connected in parallel or in series by collector wiring.

The present invention is also an electrochemical reactor bundle structure, which is characterized by comprising a structure in which a plurality of tube fuel cells composed of a dense ion conductor (electrolyte) and cathode (air electrode) laminated to a tube structure made of an anode (fuel cell) material are electrically connected in parallel by collector wiring, wherein the exposed anode tube tip is connected in parallel by collector wiring and is connected to a collector sheet by a seal layer.

The present invention is furthermore characterized by the point of an electrochemical reactor stack in which the above electrochemical reactor bundles are stacked longitudinally, the point of an electrochemical reactor system composed of the above electrochemical reactor stack, wherein the operating temperature is a lowered temperature of not more than 650° C., and the fact that the electrochemical reactor system is an electrochemical reactor system for a solid oxide fuel cell, waste gas purification, hydrogen production, or synthetic gas production.

The electrochemical reactor bundle or stack of the present invention is characterized in that a plurality of tube fuel cells composed of a dense ion conductor (electrolyte) and cathode (air electrode) laminated to an anode having a tube structure (fuel electrode) are electrically connected in parallel or in series by collector wiring such as a thin metallic wire.

Conventional tube SOFC structures have a tube diameter of 5 mm to several cm, and various methods for integrating stacks of them have been proposed. However, no effective microtube-type cells with a diameter of several millimeters or less have been reported. It is also difficult to integrate microtube-type cells with a diameter ranging from submillimeter to several millimeters using currently available methods, and so far there have been no reports of cell stacks obtained through the efficient integration of such microtube cells.

However, the method for collecting power in bundles and the use of the method for building stacks as disclosed in the present invention can be used to design a module with minimal volume and any voltage output, without a loss of thermal shock resistance or greater contact resistance, thereby making it possible to provide a highly efficient fuel cell and to provide an electrochemical reactor system in which such cell stacks are employed to allow the operating temperature to be reduced.

A manifold with an efficient arrangement of tube-type cells as well as more compact fuel gas-introducing and exhaust parts can be employed so as to be adaptable to a broad range of industrial processes and to allow manufacturing costs to be reduced. Examples of electrochemical reactor systems using the above tube electrochemical reactor cell stack include solid oxide fuel cells (SOFC), waste gas purification electrochemical reactors, and hydrogen-producing reactors. In the present invention, a highly efficient electrochemical reactor system can be constructed using the above electrochemical reactor cell stack.

Figure 2:
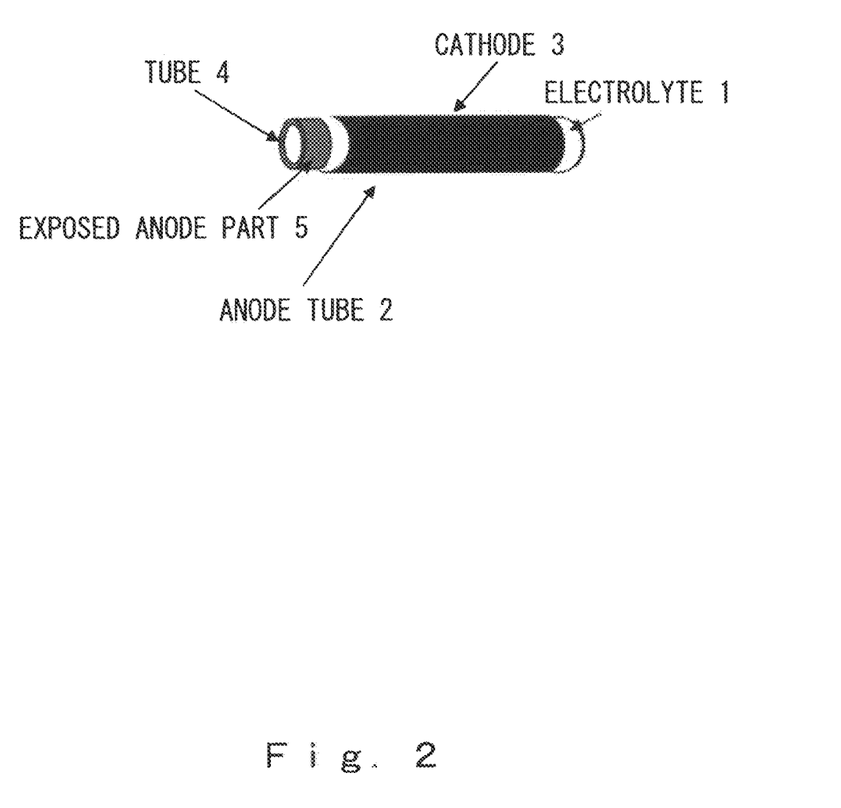
FIG. 2 is an example of a structural diagram of the tube electrochemical reactor cells of the present invention.

A tube-type electrochemical reactor in an embodiment of the present invention and an electrochemical reactor system composed thereof will be illustrated in detail next. The structure of a tube electrochemical reactor cell pertaining to the present invention will be illustrated first. FIG. 2 is a schematic illustration of a tube electrochemical reactor cell in the present invention.

As shown in FIG. 2, the dense electrolyte 1 is formed on the anode tube 2, which is composed of a hollow ceramic tube having a tube bore 4. The tube electrochemical reactor cell is built, with the cathode 3 disposed on the outside of the electrolyte layer. Under ordinary conditions of fuel cell use, a fuel gas such as hydrogen, carbon monoxide, or methane is supplied to the hollow tube bore 4, and air, oxygen, or the like is supplied to the exterior of the tube.

Here, the tube electrochemical reactor cell of the present invention preferably has a tube thickness of 0.5 mm or less and a tube diameter of 2 mm or less, preferably 1 mm or less, and even more preferably about 0.8 mm. A tube thickness of 0.5 mm or less will allow good anode electrode properties to be obtained. A tube diameter of 2 mm or less will make it possible to obtain a tube structure with a highly porous electrode structure while ensuring strength despite a tube thickness of 0.5 mm or less.

In terms of cell stack design, the tube length is not particularly limited, and can be designed in any way to obtain the necessary anode properties while taking into consideration the required overall size of the electrochemical microreactor. The tube porosity is preferably at least 30% to ensure rapid gas diffusion and promote reduction reactions.

A material with which high ion conduction can be brought about must be used as the electrolyte material, desirable examples of which include oxide compounds comprising 2 or more elements selected from Zr, Ce, Mg, Sc, Ti, Al, Y, Ca, Gd, Sm, Ba, La, Sr, Ga, Bi, Nb and W.

Of these, preferred examples include: stabilized zirconia which has been stabilized with a stabilizer such as yttria ($Y_2O_3$), calcia (CaO), scandia ($Sc_2O_3$), magnesia (MgO), ytterbia ($Yb_2O_3$), and erbia ($Er_2O_3$); and ceria ($CeO_2$) which has been doped with yttria ($Y_2O_3$), gadolinia ($Gd_2O_3$), or samaria ($Sm_2O_3$). Stabilized zirconia is preferably stabilized with one or a combination of two or more stabilizers.

Specific desirable examples include yttria-stabilized zirconia (YSZ) to which 5 to 10 mol % yttria has been added as a stabilizer, and gadolinia-doped ceria (GDC) to which 5 to 10 mol % gadolinia has been added as a dopant. In the case of YSZ, for example, an yttria content of less than 5 mol % is undesirable because the anode will have lower oxygen ion conductivity. An yttria content of more than 10 mol % is also undesirable because the anode will have lower oxygen ion conductivity. The same is true of GDC.

The tube is preferably a complex composed of a mixture of an anode material and electrolyte material. The anode material is a metal selected from Ni, Cu, Pt, Pd, Au, Ru, Co, La, Sr and Ti and/or an oxide comprising one or more of these elements, and since it functions as a catalyst, desirable examples include nickel (Ni), cobalt (Co), and ruthenium (Ru).

Of these, nickel (Ni) can be used preferentially because it is less expensive than other metals and is reactive enough with fuel gasses such as hydrogen. A complex obtained by mixing these elements and oxides can also be used. Here, the ratio of a complex of an anode material and an electrolyte is preferably in the range of 90:10 wt % to 40:60 wt %, in order to achieve a better balance in terms of the compatibility of thermal coefficient expansion and electrode activity, etc. The former and latter are preferably mixed in a ratio of 80:20 wt % to 45:55 wt %.

The cathode material, on the other hand, is preferably one with high oxygen ionization activity. Materials composed of one or more of the elements Ag, La, Sr, Mn, Co, Fe, Sm, Ca, Ba, Ni and Mg, and oxide compounds thereof, are particularly desirable. Of these, a transition metal perovskite oxide or a complex of a transition metal perovskite oxide and an electrolyte material can preferably be used. Between the electron conductivity and oxygen ion conductivity which are required of the cathode, the use of a complex will improve the oxygen ion conduction, and will therefore allow the oxygen ions produced at the cathode to more easily move into the electrolyte layer and improve the electrode activity of the cathode.

Here, when a complex of a transition metal perovskite oxide and a solid electrolyte material is used, the ratio is preferably in the range of 90:10 wt % to 40:60 wt % in order to achieve a better balance in terms of the compatibility of thermal coefficient expansion or electrode activity. The former and latter are preferably mixed in a ratio of 90:10 wt % to 70:30 wt %.

Specific desirable examples of transition metal perovskite oxides include composite oxides such as $LaSrMnO_3$, $LaCaMnO_3$, $LaMgMnO_3$, $LaSrCoO_3$, $LaCaCoO_3$, $LaSrFeO_3$, $LaSrCoFeO_3$, $LaSrNiO_3$, and $SmSrCoO_3$.

In the structure of the tube electrochemical reactor cell bundle of the present invention, as shown in FIG. 2, part of the anode tube at one end of the anode tube 2 is exposed, with the electrolyte not laminated, thus forming an exposed anode part 5. The exposed anode part 5 functions as the external lead electrode of the anode. In this case, the exposed area of the exposed anode part 5 is not particularly limited, and can be suitably adjusted taking into consideration the gas seal member, electrode collection method, gas outlet path, and the like.

Figure 3:
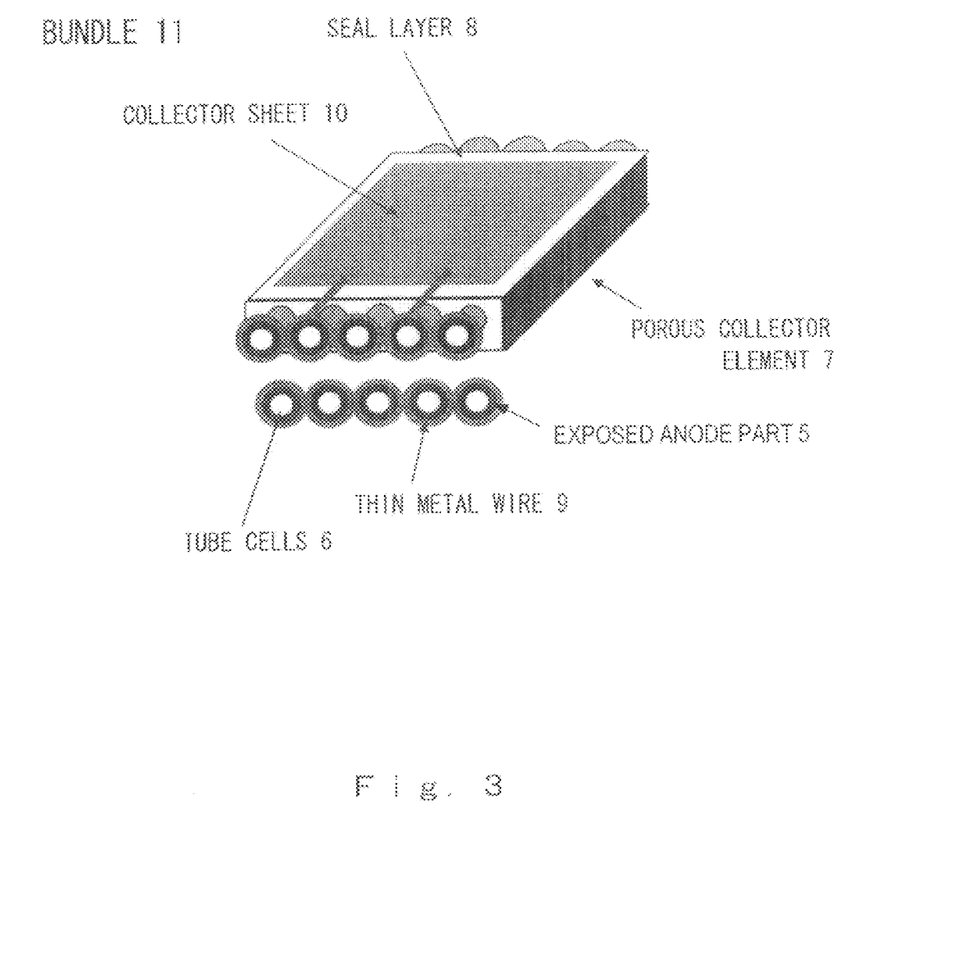
FIG. 3 is an example of a structural diagram of the tube electrochemical reactor cell bundles of the present invention.

The method for forming the tube electrochemical reactor cells of the present invention into a bundle will be illustrated next. As shown in FIG. 3, the tubes 6 are housed in the cathode porous collector element 7 which functions as the collector. Air (oxygen) is then introduced through the porous collector element 7. The upper surface and the portion of the porous collector element 7 where the cells come out are covered by the seal layer 8 of a seal member functioning as an electrical insulator and gas seal. Each tube cell 6 is connected by then metal wiring 9 via the exposed anode part 5 and is connected to the collector sheet 10.

Examples of material for the collector wiring, such as a thin metal wire, include silver, nickel, copper, platinum, iron, and alloys thereof, but are not particularly limited as long as the material is sufficiently electroconductive. As the thin metal wire is coiled around tube cells of submillimeter diameter, the diameter is preferably no more than 0.5 mm, and more preferably no more than 0.2 mm or 0.1 mm. Pre-treating the exposed anode part with a metal paste or the like can effectively reduce contact resistance. Thin metal wire is used in fuel environments and can thus be used without any problem at the fuel cell operating temperature (400 to 800° C.).

Figure 4:
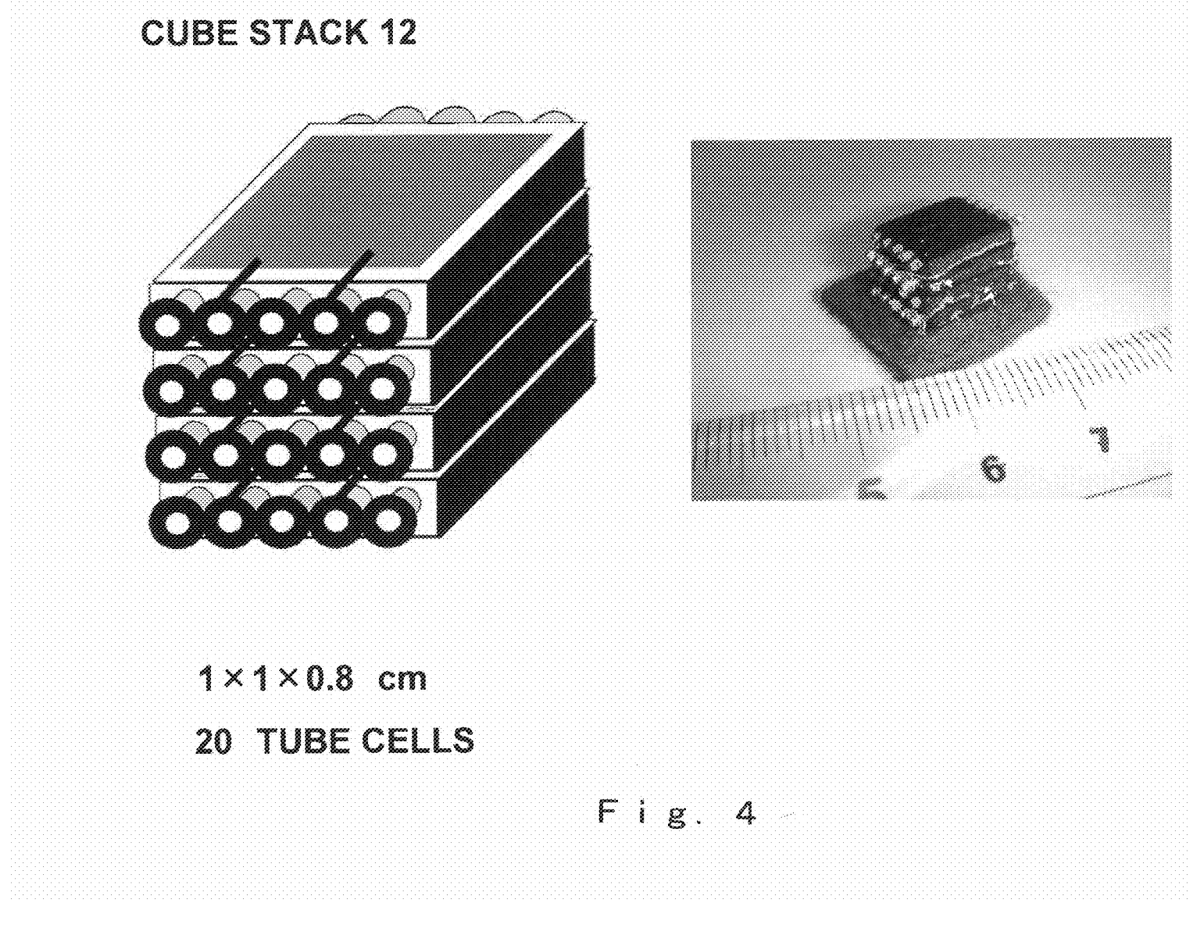
FIG. 4 is an example of a structural diagram of the tube electrochemical reactor cell stacks of the present invention.

FIG. 4 shows an example of an integrating method in which the tube electrochemical reactor bundles are electrically connected in series. One bundle has about 1 V voltage output, allowing a stack having a voltage output of 1 V×the number of stacked tiers to be built. The example in FIG. 4 is a 4-tier stack, and a cube stack 12 composed of 20 tube cells measuring 1×1×0.8 cm results in an estimated output of about 4 V. Each bundle is joined with a metal paste or the like to provide a suitable electrical connection.

The number of tiers in which the tube electrochemical reactor bundles are stacked is not particularly limited, and can be suitably determined according to the necessary output, size of the equipment, and so forth. In particular, a 5-tier bundle can be integrated per 1 $cm^3$ when 5 tube cells 0.8 mm in diameter are integrated per 1 cm square 2 mm thick porous collector element 7. This will allow the desired voltage output to be designed while minimizing the volume that is used, and is thus suitable for small-scale power-consumption devices.

Figure 5:
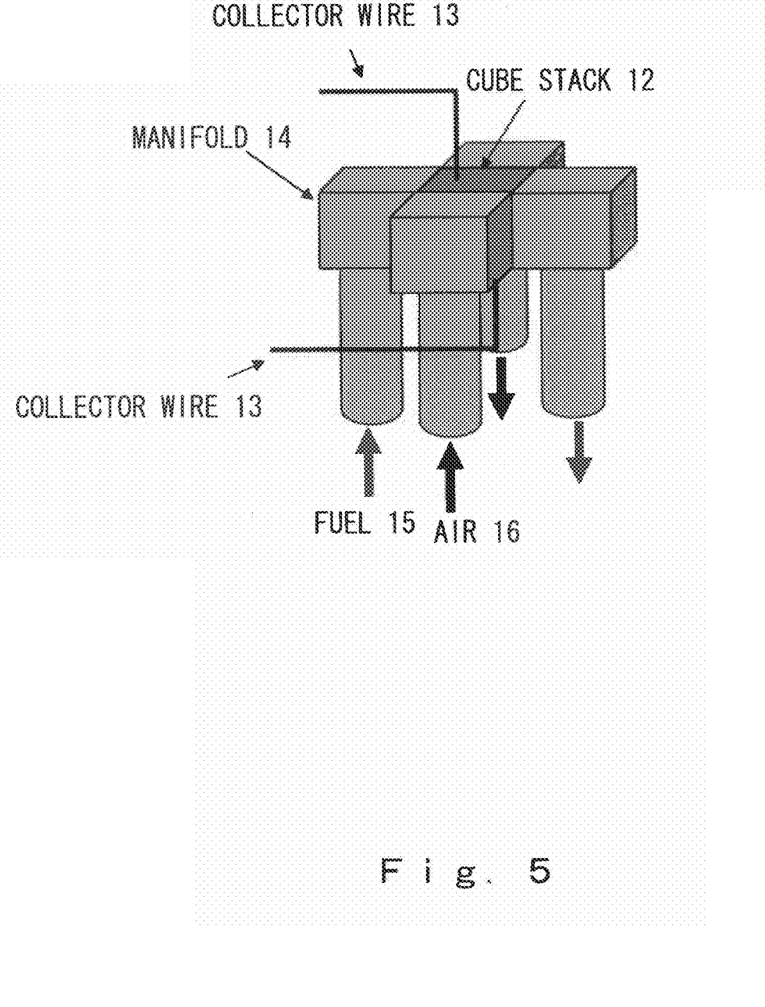
FIG. 5 is an example of a structural diagram of the attachment of the tube electrochemical reactor cell stack+gas manifold of the present invention.

FIG. 5 shows a structural diagram of a tube electrochemical reactor stack+gas manifold attachment. As illustrated in FIG. 5, power generation is enabled via collector wiring 13 by introducing fuel gas 15 and air gas 16 into the anode tube using oxidant gas (air) and fuel gas introduction means (such as an external manifold 14). Here, the flow rate of the fuel gas 15 and air 16 in the tube electrochemical reactor stack must be determined from the perspective of fuel efficiency.

Figure 6:
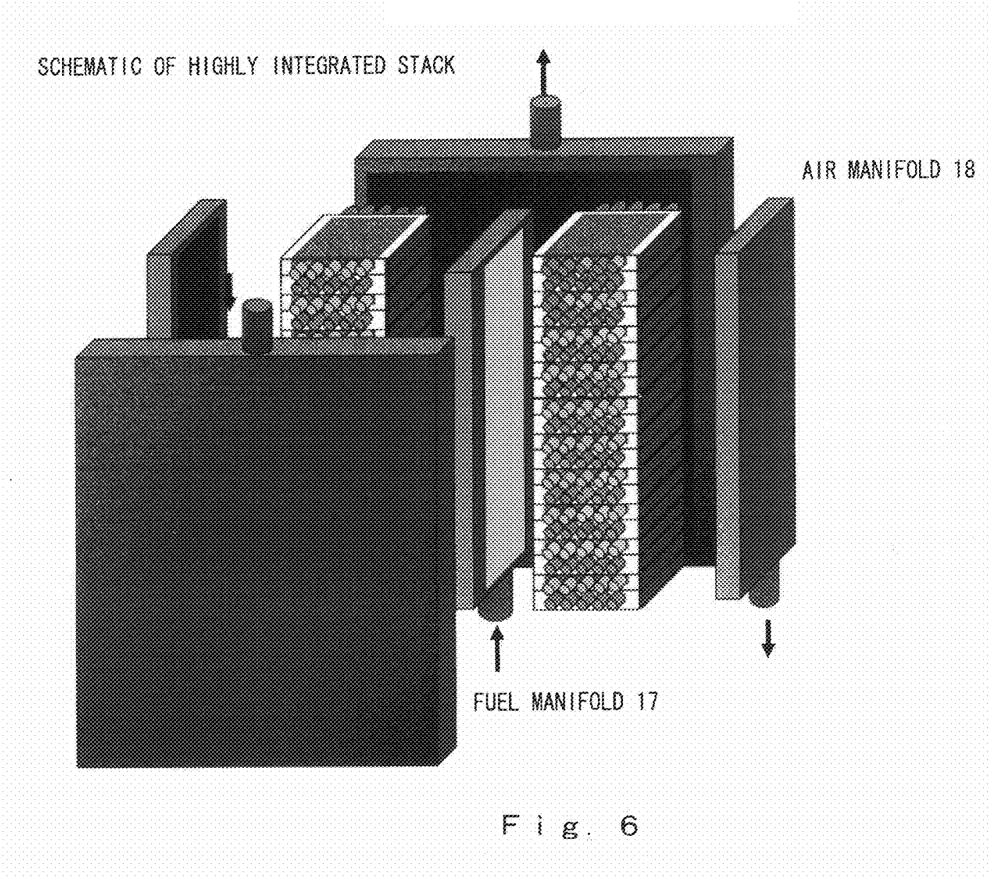
FIG. 6 is an example of a structural diagram of the highly integrated tube electrochemical reactor cell stack+gas manifold of the present invention.

FIG. 6 is a schematic illustration of a high integration stack, showing an example of two columns of 20-tier stacks having a fuel manifold 17 and air manifold 18. The manifold material is not limited as long as it can withstand the operating temperature of the electrochemical reactor, but ceramics, stainless steel, and the like are particularly suitable. The method for producing the manifolds is also not limited, and can be a manufacturing method using computer-controlled cutting or micro-casting, for example. In the above example, one operation method in which the tube electrochemical reactor of the present invention is operated as a single unit in the form of an SOFC was illustrated, but the invention is not limited to the above operating method.

The operation of the electrochemical reactor bundle, stack, and electrochemical reactor system composed thereof in the present invention will be illustrated next. The tube cells of the electrochemical reactor bundle and stack of the invention are electrically connected by thin metal wire, and even submillimeter diameter tube cells can be easily connected electrically.

It has thus far been difficult to achieve an efficiently integrated cell stack of high-performance cells with a tube diameter of a few mm or less. However, the structure of the above tube electrochemical reactor cell stack makes it possible to design a stack suitable for its intended use, and to construct a small-scale electrochemical reactor system having better power output per unit volume.

Methods suitable for manufacturing the tube electrochemical reactor cells and stack of the present invention are illustrated next. The method for manufacturing the tube electrochemical reactor cell of the present invention basically comprises steps such as the following:

(1) a step for mounting tube cells with bonding paste onto a porous collector element and baking;

(2) a step for constructing a seal layer on the upper surface of the porous collector element and tube surface;

(3) a step for joining the tube tips (exposed anode portions) with thin metal wire;

(4) a step for attaching a collector sheet onto the seal layer on the upper surface of the porous collector element and joining it to the metal wire joining the tube tips (tube electrochemical reactor cell bundle); and (5) a step for joining the resulting bundles using a conductive paste to produce a tube electrochemical reactor cell stack.

The steps are illustrated in detail below. The paste used to join the tube cells to the porous collector element will preferably include the same material as the porous collector element, with at least 50% comprising the porous element component after baking. The baking temperature is not particularly limited, as long as it is the temperature needed to ensure sufficient bonding strength, but is preferably 800 to 1200° C.

The material of the seal layer placed on the upper surface of the porous collector element and the tube surface is not particularly limited, as long as it has gas sealing properties in the operating temperature range of the system, but is preferably glass or a glass-ceramic composite, for example. The glass softening point must be a temperature higher than the system operating temperature. Glass that is free of lead and alkali metals will be suitable under the fuel cell operating conditions. When glass is used as the seal layer, the seal layer is normally built by applying a glass paste to the porous collector element and then carrying out a heat treatment at a temperature higher than the glass melting point.

The method for coiling the thin wire is not particularly limited. Thin metal wire can be coiled several times around the exposed anode part of the tube and consecutively coiled around each tube to connect them. A more stable electrical connection can be achieved by connecting each tube with a plurality of metal wiring and by securing the coiled metal wiring to the anode tube by means of a conductive paste.

The cathode or anode portion of the tube electrochemical reactor cells can also be mechanically machined as needed for patterning or dimensional adjustments. The tube cell length is not particularly limited, as long as the cell cathode or electrolyte length is determined taking into consideration the need for part of the anode to be exposed at one end of the cells.

The stack using manifolds in the present invention is capable of a variety of designs and configurations, and is not limited to the design given here. A variety of manifold configurations with gas introduction parts and exhaust parts as well as tube cell-holding parts can be designed and constructed, and can be used to produce stacks.

The present invention affords the following effects.

(1) Electrical connections based on collector wiring such as coiled thin metal wire can be adopted to reduce the connection contact resistance of tube end electrode, allowing a highly efficient tube electrochemical reactor system to be build and provided.

(2) Connecting the tube ends with collector wiring such as thin metal wire can prevent stress, strain-stress, and the like from affecting the tube ends, thus making it possible to provide tube cell bundles and stacks that are highly resistant to operating loads such as thermal shock.

(3) There has been demand for high precision tube arrangements, but it is now possible to electrically connect each tube, regardless of positional precision, with coiled collector wiring such as thin metal wire, thus making it possible to provide a method for producing readily adaptable bundles and stacks even for submillimeter tube cells.

(4) Tubes can be efficiently arranged, making them easier to structurally integrate, and they can be connected in series to provide tube electrochemical reactor cell stacks capable of greater module voltage per unit volume. It is thus possible to provide ceramic reactors that have extremely high power output even at low capacity.

(5) A manifold having an efficient tube cell arrangement as well as more compact fuel gas introduction and exhaust parts can be employed to allow a high-performance electrochemical reactor that is adaptable to a broad range of industrial process to be produced with lower manufacturing costs.

(6) The above tube electrochemical ceramic reactor cell stack can be used to provide an electrochemical reactor system such as a solid oxide fuel cell that can be operated at a low temperature no greater than 650° C.

(7) The electrochemical reactor system of the present invention is suitable for use as a fuel cell, clean energy source, or environmental purification device, for example.

DESCRIPTION OF THE PREFERRED EMBODIMENTS

The present invention is explained in more detail below based on examples, but the present invention is not in any way limited by these examples.

Example 1

Figure 7:
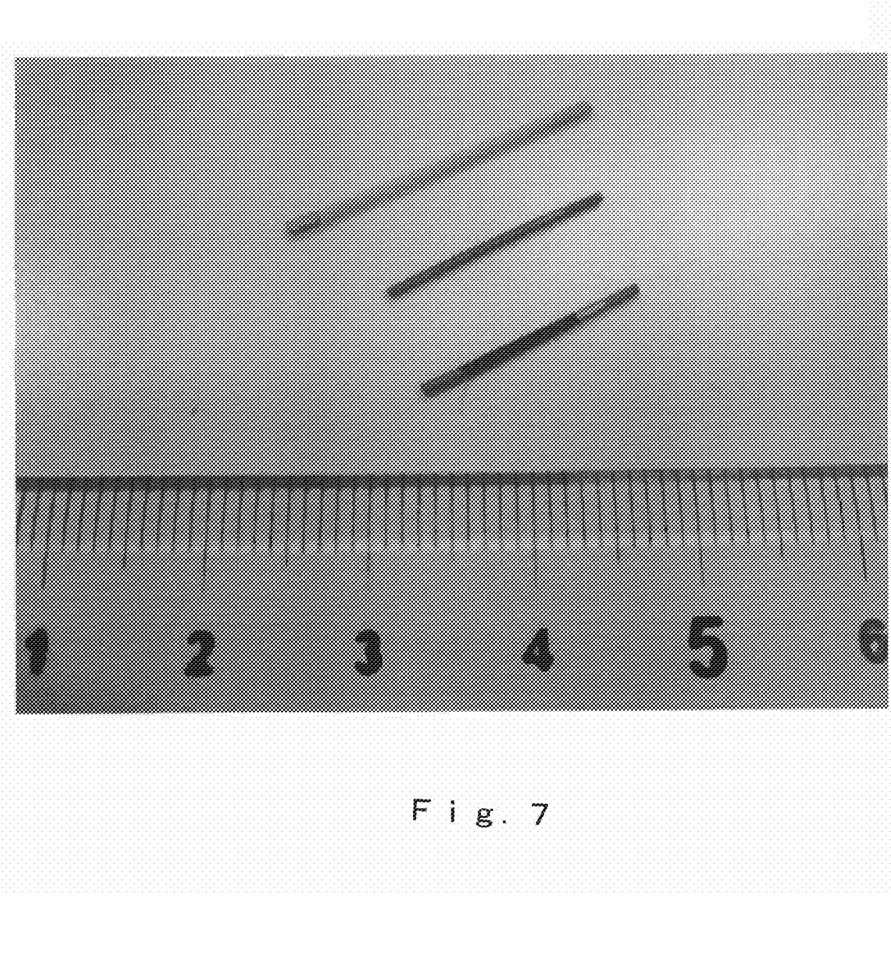
FIG. 7 is a photograph of the manufacturing process of the tube electrochemical reactor cells of the present invention.

In this example, a tube electrochemical reactor cell was produced according to the following procedures. FIG. 7 illustrates the appearance of the tubular structure that was made. First, nitrocellulose was added as a binder to NiO (Wako) and a powder having a $CeO_2$-10 mol % $Gd_2O_3$ (GDC) composition (Anan Kasei), and the ingredients were kneaded with water into a clayish paste which was then extruded into a tubular molding. The resulting tubular molding had a diameter of 1 mm and a tube thickness of 0.2 mm.

The opening at one end of the resulting tubular molding was then sealed with vinyl acetate, and the tube was dipped in a slurry containing a solid electrolyte with a GDC composition, thus dip coating an electrolyte layer-forming layer and giving an electrolyte-coated molded tube. 3 mm at the other end of the porous anode tube was left bare, forming the exposed anode part.

The tubular molding was then dried and then baked for 2 hours at 1400° C., giving an electrolyte-coated anode tube. A paste including $LaSrCoFeO_3$ (Japan Ceramics) and the electrolyte material GDC in a container was applied as the cathode material to the electrolyte layer, dried at 100° C., and baked for 1 hour at 1000° C. A tube electrochemical reactor cell was thus obtained. The completed cell had a tube diameter of 0.8 mm and a tube thickness of 0.15 mm.

Figure 8:
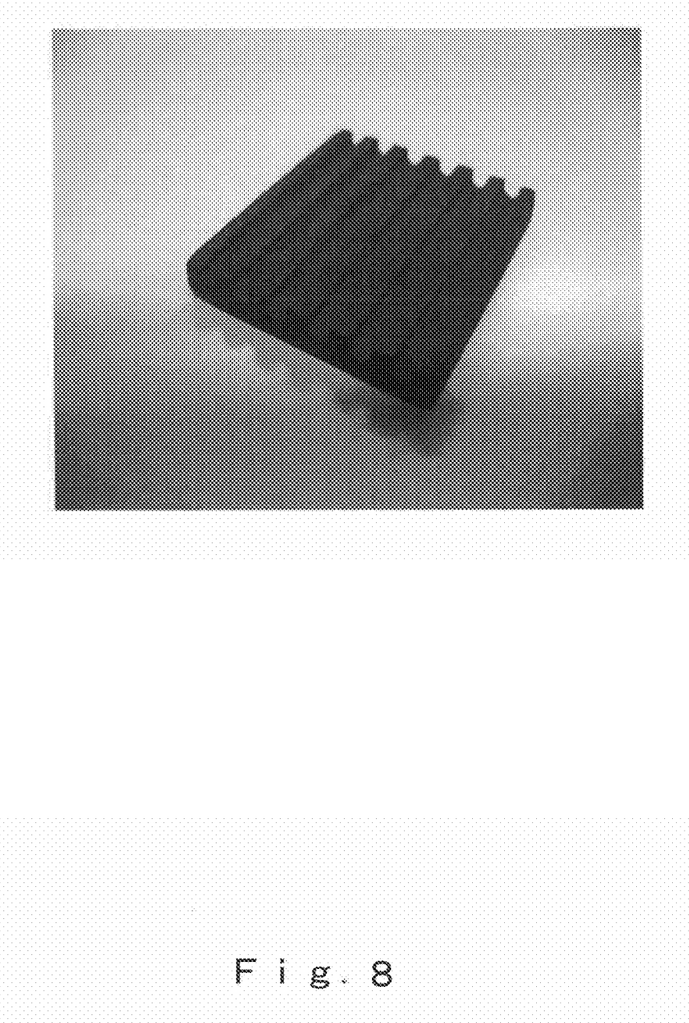
FIG. 8 is a photograph of the porous collector element for supporting the tube cells produced form the cathode material in the invention.

$LaSrCoFeO_3$, a pore-forming agent, and nitrocellulose were added and kneaded with water into a clayish paste which was then extruded to produce a tube cell support structure (see FIG. 8) in the same way as when the tube cell was produced. It was baked for 1 hour at 1400° C., giving a porous collector element. As shown in the figure, the tube cells were arranged in the grooves of the collector, the grooves were filled in with a paste containing $LaSrCoFeO_3$, and the paste was baked at 1000° C. to secure the tube cells.

Figure 9:
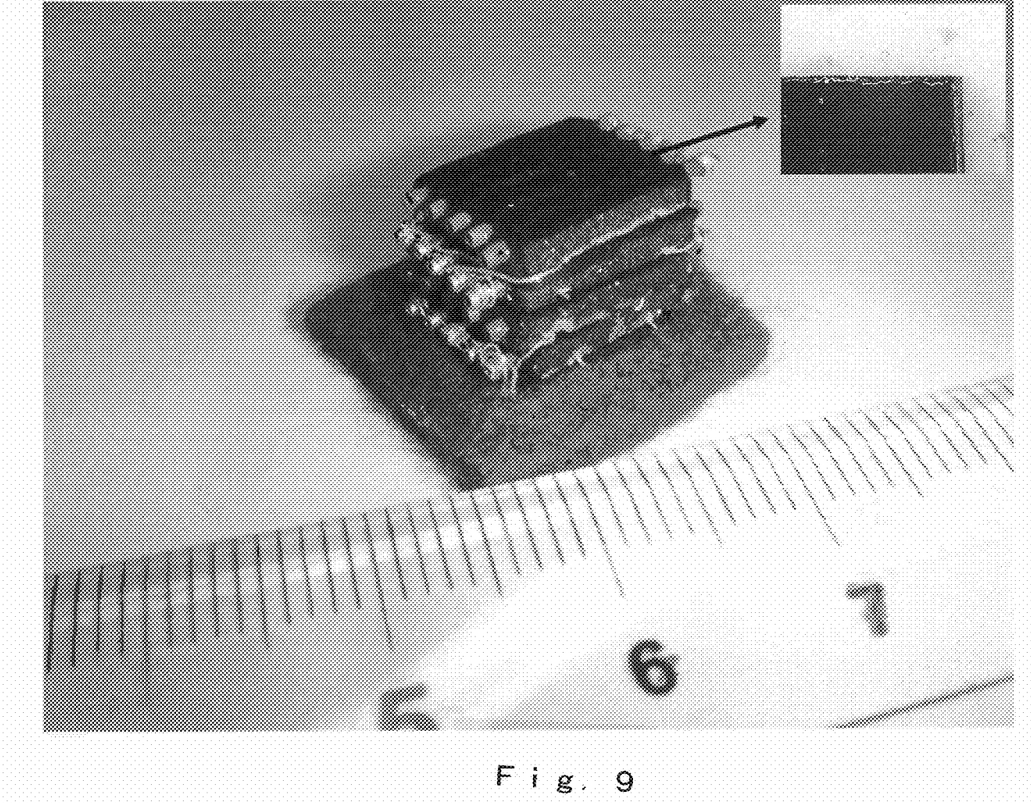
FIG. 9 is a photograph of the tube electrochemical reactor cell stack (4-tier stack in which the basic structure is a bundle of 5 tube cells) in the present invention.

A glass paste (Asahi Glass) was applied to the porous collector element on which the tube cells had been mounted, and a glass seal layer was formed on the upper surface and protruding surface of the tube cells. 0.1 mm silver wire was coiled around the exposed anode part, and coiled as such around adjacent tubes to electrically join 5 tube cells per bundle. This structure served as 1 unit. Four units were electrically connected in series with conductive paste to produce tube electrochemical reactor stack (see FIGS. 9 and 10).

Example 2

Figure 10:
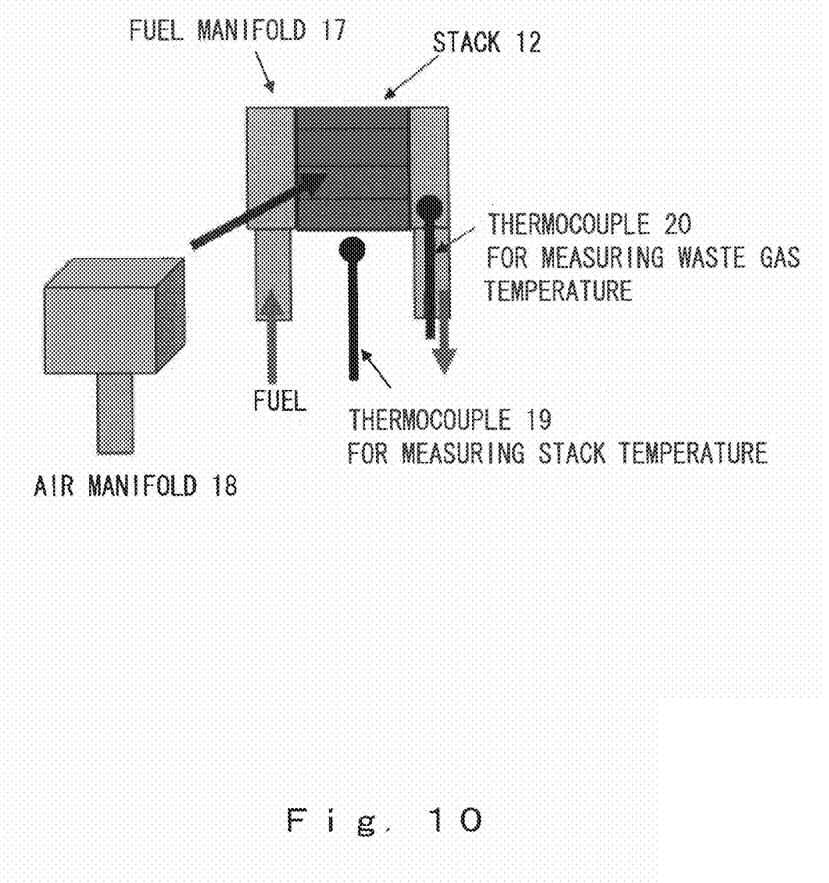
FIG. 10 is a schematic diagram measuring the tube electrochemical reactor cell stack shown in FIG. 9.
Figure 11:
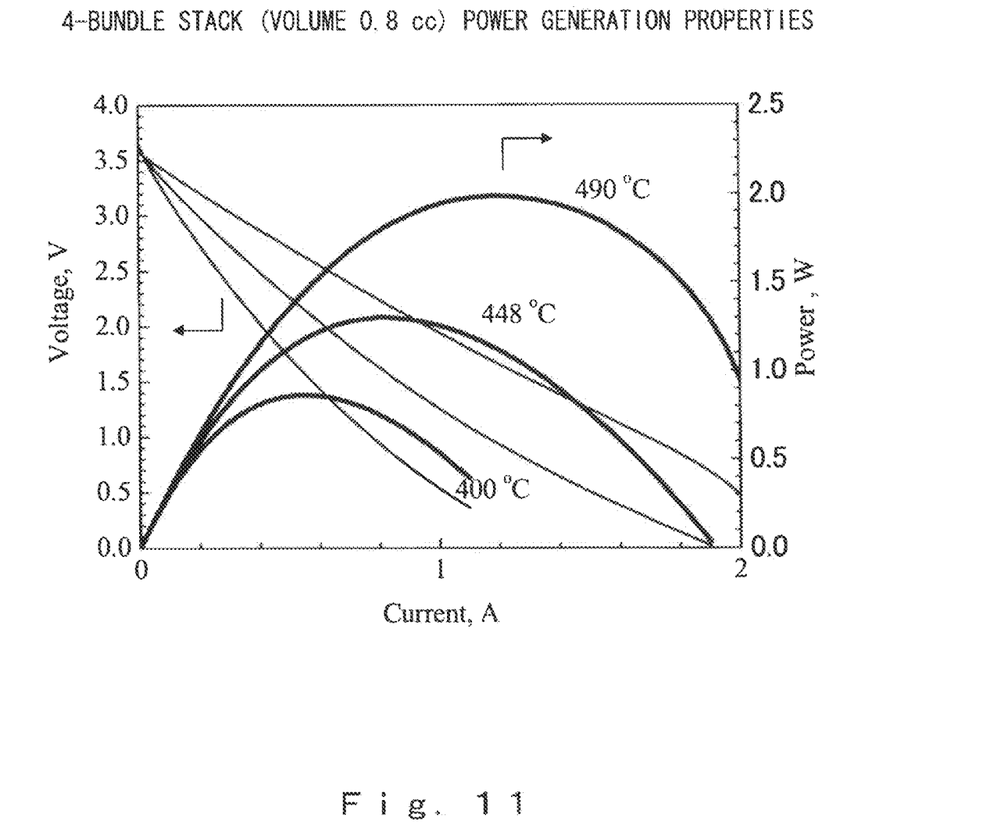
FIG. 11 shows the results of a power generation performance test on the tube electrochemical reactor stack shown in FIG. 9.

The tube electrochemical reactor stack obtained in Example 1 was connected to a gas introduction pipe (see FIG. 5). The connections were sealed with ceramic paste, and hydrogen and air were supplied as fuel gas through the fuel manifold 17 and air manifold 18 to the tube electrochemical reactor stack 12. Then, as shown in FIG. 10, the stack temperature and gas outlet temperature were measured with a stack temperature-measuring thermocouple 19 and a waste gas temperature-measuring thermocouple 20. FIG. 11 shows the results at stack temperatures of 400 to 490° C. as the power generating properties of the 4-bundle stack (volume 0.8 cc). It could be demonstrated that a stack no greater than 1 cc was capable of generating power equal to a stack voltage of 3.6 V and a voltage of 2 W or more at a low temperature of no more than 500° C.

Example 3

Figure 12:
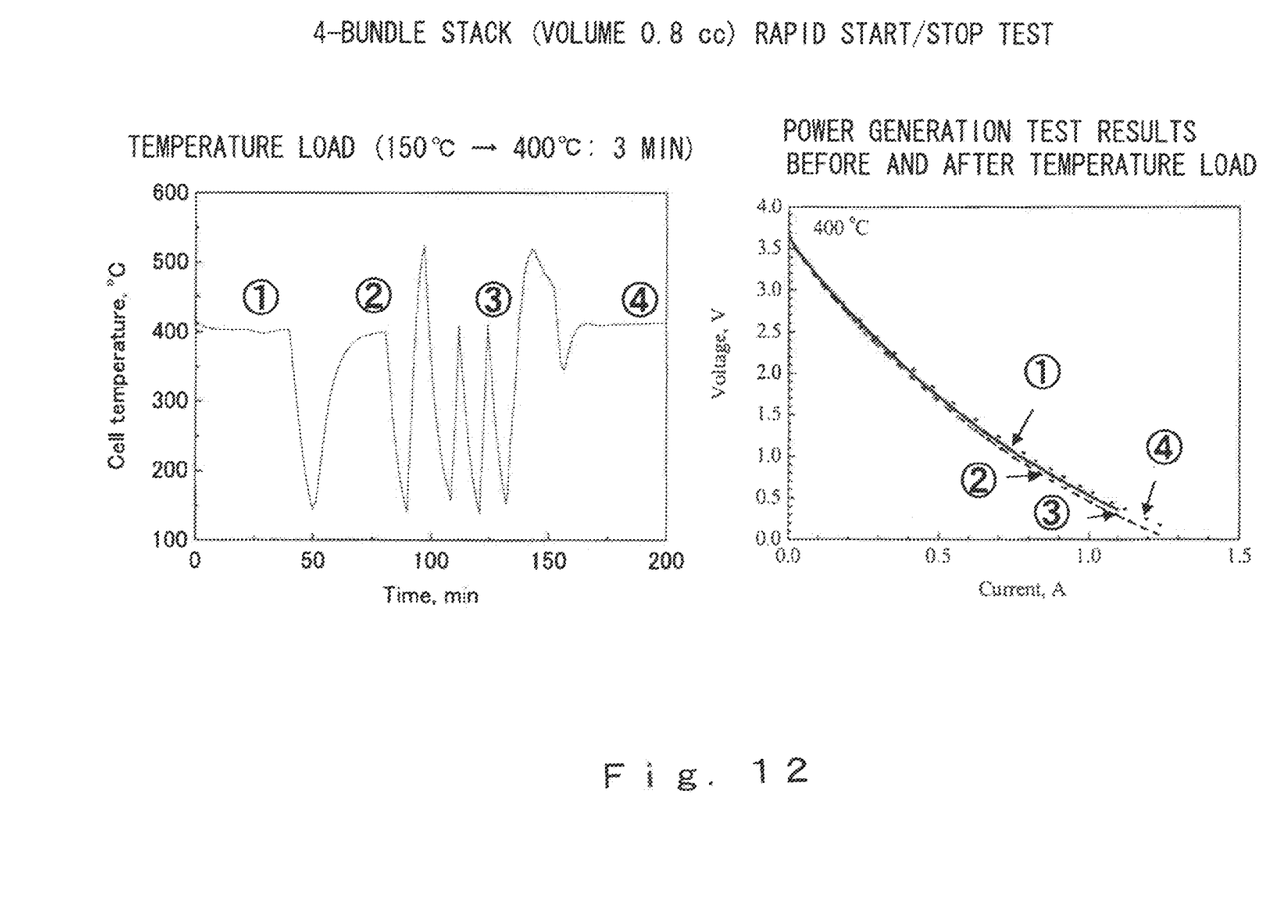
FIG. 12 shows the temperature load profile and power generation performance test results for a rapid start up test of the tube electrochemical reactor stack shown in FIG. 9.

The tube electrochemical reactor stack obtained in Example 1 was subjected to a rapid start/stop test. The cell performance was measured over time during repeated cycles of 150° C.→400° C. (start time: 3 min) and 400° C.→150° C. (stop time: 10 min) as shown in FIG. 12 (left). The results are given in FIG. 12 (right), indicating a constant output that was virtually unaffected by rapid starts and stops.

Embodiments of the present invention were explained in detail above, but the present invention is not limited to these embodiments and is capable of various modifications within the scope of the invention. For example, the embodiments above were examples of only single stacks, but structures comprising further building up of stacks can be produced by the same procedures.

As described above, the present invention relates to tube electrochemical reactor cell bundles and stacks, as well as an electrochemical reactor system composed thereof, whereby the present invention can provide electrochemical reactor bundles and stacks having a structure that is electrically connected by collector wiring. The tube electrochemical reactor cell bundles and stacks of the present invention allow microtube ceramic reactor cells to be efficiently stacked to produce and provide a high performance SOFC. The above structure allows the operating temperature to be lowered to no more than 600° C., even with the use of conventional materials. It is thus possible to produce and provide an electrochemical reactor cell stack, as well as an electrochemical system such as a solid oxide fuel cell using them, that have better cost performance.

Furthermore, a manifold having an efficient tube cell arrangement as well as more compact fuel gas introduction and exhaust parts can be employed to allow a high-performance electrochemical reactor that is adaptable to a broad range of industrial process to be produced with lower manufacturing costs. The present invention is useful for providing novel techniques and novel products related to novel types of electrochemical reactor cell stacks involving the use of tube cells, as well as electrochemical reactor systems such as solid oxide fuel cells employing such electrochemical reactor cell stacks.

What is claimed is:

1. An electrochemical reactor stack comprising a plurality of longitudinally stacked electrochemical reactor bundles having an electrochemical reactor bundle structure, comprising a plurality of tube fuel cells, in which each cell is formed of a dense ion conductor as electrolyte and cathode as air electrode which are laminated to an anode as fuel electrode material having a tube structure, the plurality of tube fuel cells are arranged in one-dimensional direction and are electrically connected in parallel or in series by collector wiring,
wherein
the tube structure comprises submillimeter diameter tubes having a tube diameter not greater than 2 mm and a tube thickness not greater than 0.5 mm,
part of an anode tube is exposed at one end, with the electrolyte not laminated, to form an exposed anode part which functions as an external lead electrode thereof,
the tubes are housed in a cathode porous collector element which functions as a collector,
each tube cell is connected by coiling a thin metal wire of collector wiring around the exposed anode part and is connected to a collector sheet,
the collector sheet is connected to the cathode porous collector element of another bundle to form a stack structure, and
an upper surface and a portion of the porous collector element where the cells come out are covered by a seal layer of a seal member functioning as an electrical insulator and gas seal.

2. The electrochemical reactor stack according to claim 1, wherein the plurality of tube fuel cells are electrically connected in parallel by coiling a thin metal wire of collector wiring around the exposed anode part.

3. The electrochemical reactor stack according to claim 1, wherein the plurality of tube fuel cells are electrically connected in series by coiling a thin metal wire of collector wiring around the exposed anode part.

4. The electrochemical reactor stack according to claim 1, wherein the thin metal wire of collector wiring has a diameter not greater than 0.5 mm.

5. The electrochemical reactor stack of claim 1, wherein the plurality of tube fuel cells are integrated in parallel, an exposed tube tip of the anode is connected in parallel by metal wiring and is connected to the collector sheet via the seal layer.

6. An electrochemical reactor stack structure, comprising the electrochemical reactor stack of claim 1, wherein a plurality of the reactor stacks are integrated.

7. An electrochemical reactor system, comprising the electrochemical reactor cell stack structure of claim 6, wherein an operating temperature is 650° C. or less.

8. The electrochemical reactor system according to claim 7, wherein the electrochemical reactor system is an electrochemical reactor system for a solid oxide fuel cell, waste gas purification, hydrogen production, or synthetic gas production.

* * * * *